H. P. Dillingham,
Saw.
No. 51,385.   Patented Dec. 5, 1865.
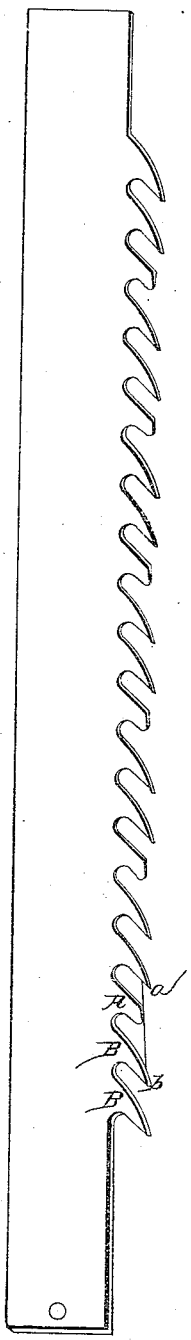
Witnesses.   Inventor.

UNITED STATES PATENT OFFICE.

HIRAM P. DILLINGHAM, OF NORWALK, OHIO, ASSIGNOR TO M. O. WAGGONER AND GEO. P. ROBERTS, OF SAME PLACE.

IMPROVEMENT IN SAWS.

Specification forming part of Letters Patent No. 51,385, dated December 5, 1865.

*To all whom it may concern:*

Be it known that I, HIRAM P. DILLINGHAM, of Norwalk, Huron county, in the State of Ohio, have invented certain new and useful Improvements in Saws; and I do hereby declare that the following is a full and exact description thereof, reference being had to the accompanying drawings, and to the letters of reference thereon marked.

The object of my invention is to so construct the teeth of all kinds of saws used for cutting lumber as to prevent the teeth from making too deep a cut; and the nature of my invention consists in making certain of the teeth—for instance, every third or fourth tooth—serve as guards, so as to preclude a cut deeper than the pitch-line of the guard-teeth. That the natural tendency of a saw with only hooked teeth would be to draw the carriage, with the log or timber, to the saw in such a manner as to clog the run of the saw to such an extent in knotty and cross-grained timber as to break the machinery used in propelling the saw. In order to obviate the aforesaid difficulty I have invented the guard-teeth to prevent the clogging, and thus control the cut of the saw.

In the drawing, B represents the cutting-teeth, which are pointed or formed of the desired shape best suited for cutting.

A are the guard-teeth, and are in shape and size, where they join the blade of the saw, like the cutting-teeth, but have the cutting-points rounded and cut off, so that the guard-teeth, as shown at *a b*, shall be shorter than the cutting-teeth, the depth of the desired cut being equal to the difference between the length of the guard and of the cutting-teeth. By this construction I impart to the saw greater durability, since, by graduating the saw to one certain cut, I avoid the danger of breaking the teeth, or injuring the driving-machinery by accidentally taking too deep a cut.

It is seen at a glance that in operating a saw thus constructed the guard-teeth will operate so as to keep the cutting-teeth from making a "cut" deeper than the pitch-line of the guard-teeth.

Having described my invention, what I claim as new, and desire to secure by Letters Patent, is—

Constructing saws in such a manner as that certain of the teeth shall operate as guards to prevent the saw from feeding too much or clogging in the timber, substantially as described.

HIRAM P. DILLINGHAM.

In presence of—
 THOMAS E. BUCKLEY,
 C. G. LAZEAR.